US 6,553,468 B1

United States Patent
Smith

(10) Patent No.: US 6,553,468 B1
(45) Date of Patent: Apr. 22, 2003

(54) STORAGE METHOD FOR PERSONAL DIGITAL DEVICES

(75) Inventor: Gordon James Smith, Rochester, MN (US)

(73) Assignee: International Buisness Machines Corporation, Armonk, NY (US)

( * ) Notice: Subject to any disclaimer, the term of this patent is extended or adjusted under 35 U.S.C. 154(b) by 304 days.

(21) Appl. No.: 09/603,358

(22) Filed: Jun. 26, 2000

(51) Int. Cl.⁷ .............................................. G06F 13/00
(52) U.S. Cl. ...................................... 711/159; 711/156
(58) Field of Search ................................ 711/159, 163, 711/156

(56) References Cited

U.S. PATENT DOCUMENTS

| | | | | |
|---|---|---|---|---|
| 5,671,374 A | * | 9/1997 | Postman et al. | 235/472.01 |
| 5,887,145 A | * | 3/1999 | Harari et al. | 710/13 |
| 5,926,756 A | * | 7/1999 | Piosenka et al. | 455/418 |
| 6,088,730 A | * | 7/2000 | Kato et al. | 455/556 |
| 6,154,819 A | * | 11/2000 | Larsen et al. | 365/185.33 |
| 6,178,403 B1 | * | 1/2001 | Detlef | 369/273 |
| 6,266,724 B1 | * | 7/2001 | Harari et al. | 710/13 |
| 6,321,158 B1 | * | 11/2001 | DeLorme et al. | 340/995 |
| 6,374,245 B1 | * | 4/2002 | Park | 707/10 |
| 6,374,277 B2 | * | 4/2002 | Vong et al. | 708/112 |
| 2002/0023177 A1 | * | 2/2002 | Dobbek | 709/321 |

OTHER PUBLICATIONS

"Mastering Windows 3.1, Special Edition", Sybex Inc., pp. 119–127 and637–638.*

* cited by examiner

Primary Examiner—Reba I. Elmore
(74) Attorney, Agent, or Firm—Christopher H. Lynt; James R. Nock

(57) ABSTRACT

In a device having data storage, storage space is adaptively controlled by monitoring what pre-stored instructional information is used and how the pre-stored instructional information is used. Some or all of the storage space containing the pre-stored instructional information may be overwritten with user data based on the adaptive control. However, some instructional information may be designated as not overwritable. If access to an external storage device is detected, such as via a communications network to a remote web site, then the pre-stored instructional information can be partially or completely overwritten and instructional information accessed when needed from the external storage device. If additional storage space is still required for user data after all the overwritable pre-stored instructional information has been overwritten, then user data may be transferred to the external storage device for remote storage. The overwriting may be automatic or interactive.

20 Claims, 5 Drawing Sheets

STORAGE METHOD FOR PERSONAL DIGITAL DEVICES

BACKGROUND OF THE INVENTION

1. Field of The Invention

The invention relates to the field of data storage, and in particular, to data storage for a personal digital device (PDD).

2. Background Information

A personal digital device (PDD) as the term is used herein, refers to small, portable devices, which store and manipulate information in digital form, such as digital cameras, both still and video, so-called personal assistants, hand-held computers, mp3 players, cell phones, pagers, and the like.

With such devices, storage capabilities are often at a premium because of size, weight and cost constraints, for example. On the other hand, because such devices often have many complicated features, setting up and using these devices may require a considerable amount of training time and detailed information for the new user. It is, therefore, convenient to provide on-board instructions relating to setting up and using the device and its various features. However, once a user has become familiar with setting up and using the device, the on-board information is no longer needed. Since the on-board set up and training information requires storage space, which as noted above, is limited, after the information is no longer needed, retaining it is a waste of a valuable resource.

Therefore, there is a need for a way to satisfy the requirement that set-up and training information be available on-board for a new user, and at the same time, satisfy the desire to make optimal use of the limited storage space available on-board.

SUMMARY OF THE INVENTION

It is, therefore, a principle object of this invention to provide a method and apparatus for storing data on a personal digital device.

It is another object of the invention to provide a method and apparatus that solves the above mentioned problems so that instructional information is available for the new user, but storage space is not wasted when the instructional information is no longer needed.

These and other objects of the present invention are accomplished by the method and apparatus disclosed herein.

According to an aspect of the invention, instructional information is pre-stored on a device for the new user.

According to an aspect of the invention, the instructional information is adaptively over-written as the new user becomes more and more experienced, depending on how the information is used.

According to another aspect of the invention, the process of adaptively over-writing the instructional information is based on how useful the information is to the user, i.e., how the user accesses the information.

According to another aspect of the invention, in the process of adaptively over-writing the instructional information, instructional information is over-written only after all of the nominal user data space has been consumed.

According to another aspect of the invention, the initial frequency of access to instructional data defines its usefulness.

According to another aspect of the invention, the more time that the most basic instructional data is used, the more novice the user.

According to another aspect of the invention, basic information is subdivided into basic and intermediate basic information. If the basic and intermediate basic information are not accessed, only the advanced information is retained.

According to another aspect of the invention, if the basic information has not been accessed by the time that all of the user storage space is consumed, then the basic information is eliminated.

According to another aspect of the invention, the invention is particularly useful with a reusable/recyclable personal digital system that is capable of capturing and storing digital information, such as a digital still or video camera.

According to another aspect of the invention, in the emerging market for small personal digital devices, the invention offers a way to store vast amounts of instructional, advertisement, and other information that is pre-loaded onto a device, and yet delete it by over-writing adaptively based on how useful the information is to the user. The method is transparent to the user, and the device is easy to use.

According to another aspect of the invention, the capability afforded by digital technology is taken advantage of, allowing for user flexibility and utility.

According to other aspects of the invention, a storage device includes both a user storage area and an area for instructions, updates, etc. The instructional data is eliminated only after all of the nominal user data space is consumed. The specific pre-loaded instructions that are over-written are chosen based on their importance to a particular user. For example, this intelligent overwriting can be based on what operational features on a specific device have already been mastered by a user, what features are not typically used or will probably not be used, and what access the device has to a communications network where the information might be readily accessed rather than from the storage on the device. The invention may be applicable to a wide variety of old and new devices.

According to another aspect of the invention, the way in which data is stored and retrieved from a recyclable digital device that employs a storage device is controlled. After recycling of the digital device, the storage device would be rewritten to again contain primarily information relevant to setting up and using the recyclable device. For example, a digital recyclable video camera uses an internal hard disk drive containing instructions on how to use the video camera. These instructions are viewed using the video camera itself. As the user becomes more familiar with the video camera, the instructions are gradually overwritten with user data such as video footage. For instance, basic information about how to use the video camera could be erased or designated as erasable, after the user uses the video camera for a total of 10 minutes. After 30 minutes of usage, more advanced instructional materials could be erased or designated as eraseable, as appropriate.

According to another aspect of the invention, the data stored on a hard drive inside of a video camera at some particular instant in time is controlled. Initially, a substantial fraction of the storage space on the hard drive is occupied with instructional information, e.g., an instructional video. This information is progressively overwritten based on the perceived user familiarity with the camera and the need for additional user storage space. For example, if the user begins immediately using the device to capture video and does not view the basic introductory video training sequences stored on the hard drive, then these introductory sequences can be overwritten first. On the other hand, if a user spends a great deal of time repeating the basic introductory information, then it could be determined that the user will not use the more advanced information that is stored on the hard drive. In this case, the more advanced information could be overwritten first.

According to another aspect of the invention, the invention monitors user activity and decides when and what pre-loaded information is overwritten first.

According to another aspect of the invention, if the device is "web-aware," that is, the device has interoperability with a communications network, e.g., a dedicated manufacturer dial-up network or a public network, such as the 'Internet' or 'World Wide Web', which contains downloadable information about the device, then it may be possible to overwrite most, if not all, of the pre-loaded information.

According to another aspect of the invention, when all instructional information has already been overwritten with user data, and additional storage space is still required, a warning is issued, and then a check is made to determine if the device has is "web-aware," that is, has access to storage at a remote web site, or other external storage device.

According to another aspect of the invention, where the device is "web-aware," when the available storage space on-board has been used up, user data can be transferred to remote storage over the network.

According to another aspect of the invention, where the device is not "web-aware," when the available storage space on-board has been used up, user data can be transferred to an external data storage device if available. For example, the device may have a port for transferring data to a portable disk drive, such as a zip drive, for external storage.

According to another aspect of the invention, where the device is "web-aware," updates of instructional information can be access from a remote manufacturer support web site.

According to another aspect of the invention, during a recycling phase, when the device is prepared for re-use or re-sale, the most current instructions are again loaded onto the hard drive.

According to another aspect of the invention, pre-loaded information may contain commercials (in the case of video), advertisement images, sound tracks, etc. In this case, the first data to be overwritten as the user becomes more experienced might be the ads.

According to another aspect of the invention, certain instructional information may be marked as read-only, i.e., overwriting of some information is prevented. Such information which would be protected in the case of a digital camera, for example, could be an address of where to send stored images, either electronically over a network or physically through a removable memory device, to have the images printed out.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
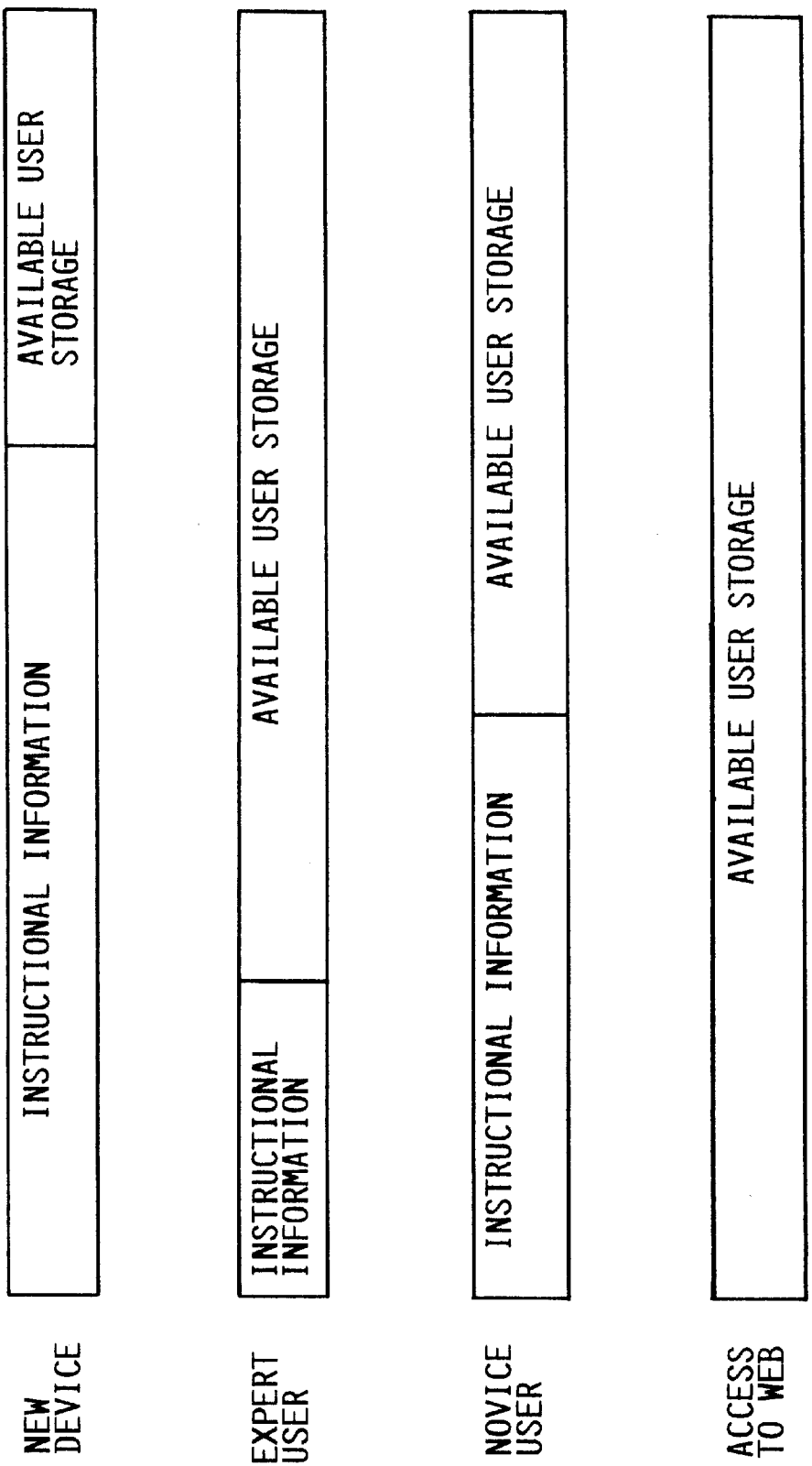
FIG. 1 is a diagram showing a representation of the data stored in a new device, and at particular times for different user types, according to an exemplary embodiment of the present invention.

The invention controls the way in which data is stored and retrieved from a digital device, such as a digital video camera, that employs a storage device, e.g., a direct access storage device (DASD) such as a hard disk drive, or another type of storage medium, such as a floppy disk, flash memory, optical read/write device, etc. FIG. 1 is a diagram showing a representation of the data stored on a hard disk drive inside of such a video camera at particular instants in time and/or for different types of users.

It is noted that FIG. 1 shows a simple scenario for the purposes of explaining the invention, illustrating an exemplary allocation of storage for a new device and for different users at particular snapshots in time, according to the invention.

With reference to FIG. 1, initially, when new, the digital device DASD could contain a complete set of instructional information related to setting up and using the device, as well as a certain amount of storage available for user data. This is represented in the top portion of FIG. 1, labeled 'NEW DEVICE." In this case, a substantial fraction of the storage space on the hard drive is occupied with an instructional video, for example. This instructional information is progressively overwritten based on the perceived user's familiarity with the camera. This is represented by a progression between the stages in the first three section of FIG. 1. For example, a normal progression might be from 'NEW DEVICE, to 'NOVICE USER,' to 'EXPERT USER,' in which case more and more of the instructional information would be overwritten as the user became more familiar with using the digital device.

However, the progression need not be from NEW DEVICE to NOVICE USER to EXPERT USER. For example, in the case of a video camera, if the new user begins immediately using the device to capture video and does not bother to view the basic introductory video training sequences stored on the hard drive, then these introductory sequences would be selected to be overwritten first. In this situation, the progression in FIG. 1 could be from NEW DEVICE directly to EXPERT USER without a NOVICE USER stage.

On the other hand, if a user spends a great deal of time repeating the basic introductory information, then it is perceived that the user will never need to use the more advanced information that is stored on the hard drive. So in this case, the more advanced information could be selected to be overwritten first. In this situation, the progression in FIG. 1 could be from NEW DEVICE to NOVICE USER, the EXPERT USER category never being attainable.

Thus, one feature of the invention is the monitoring of the user activity, and deciding how to progress, i.e., deciding what pre-loaded information is overwritten, and when.

As represented in the bottom section of FIG. 1, if the device is "web-aware," that is, the device has interoperability with and access to a communications network that contains information about the device that can be downloaded, then it may be possible to overwrite most if not all of the pre-loaded information. This could be done as an option the first time, or at any subsequent time, that the user logs-on to a manufacturer's web site.

The digital device may be a recyclable device. In that case, after recycling, the storage device contains primarily information relevant to setting up and using the recyclable device. For example, a digital recyclable video camera uses an internal hard disk drive, or another type of storage medium, such as a floppy disk, flash memory, optical read/write device, etc., containing instructions on how to use the video camera. These instructions are viewed using the camera itself. As the user becomes more familiar with the device, the instructions are gradually overwritten with user data (such as video footage in the case of a video camera). For example, information about how to use a video camera is erased after the user uses the video camera for a total of 10 minutes. After 30 minutes or usage, more advanced instructional materials are replaced as required.

During the recycling phase when the device is prepared for re-use or re-sale, the most current instructions are again loaded onto the hard drive.

The pre-loaded information may contain commercials (in the case of video), advertisement images, sound tracks, etc. In these cases, the first data to be overwritten might be the ads.

Figure 2:
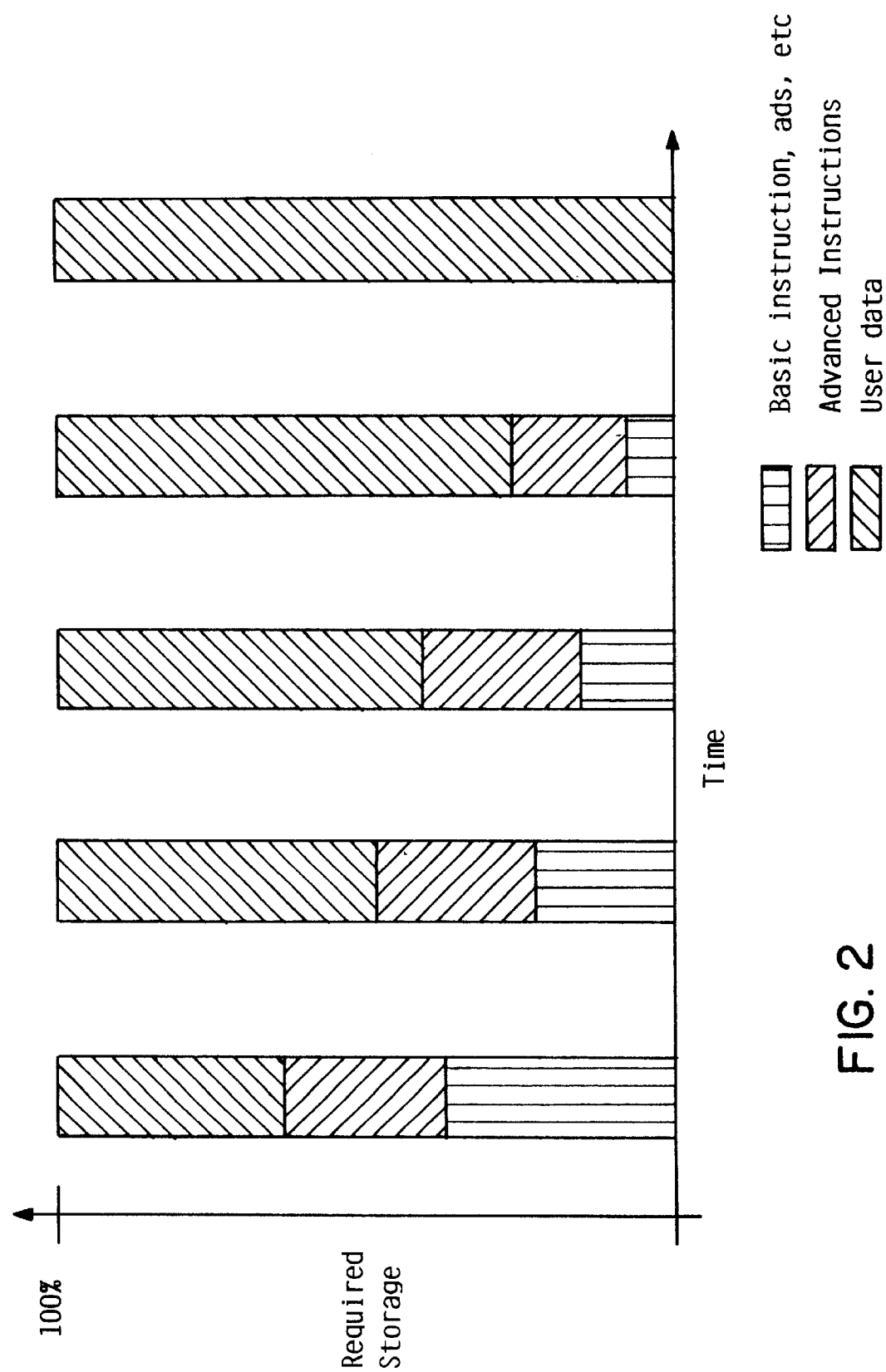
FIG. 2 illustrates the changing storage requirements for basic and advanced instructions, and user data, according to an exemplary embodiment of the invention.

FIG. 2 is a bar chart which illustrates one scenario of changing storage requirements for basic instructions, advanced instructions, and user data with respect to time. In FIG. 2, the evanescence of the original pre-loaded data is shown in more detail.

As noted earlier, one aspect of an exemplary embodiment of the invention involves determining whether a user is a novice or is an expert based on what parts of the pre-loaded information is used and whether the device has access to the same pre-loaded information from other sources, such as the Internet. Also, in the case where Internet access is available, the instructional information could be updated from a manufacturer support web site, for example.

In FIG. 2, it is assumed that the user reviews only the most basic functions via the pre-loaded instructions and does not review this information again. Therefore, as the storage space for the user data increases to the point that the pre-loaded information must be overwritten, the most basic information is overwritten first. This leaves the more advanced information as the user requires more details about device operation, for example. In the end, all of the available storage is used for user data.

Using the disposable camera example, all of the memory can contain user data because there is no longer any need for instructions. The present invention therefore has a feature which can be thought of as "disposable instructions."

Figure 3A:
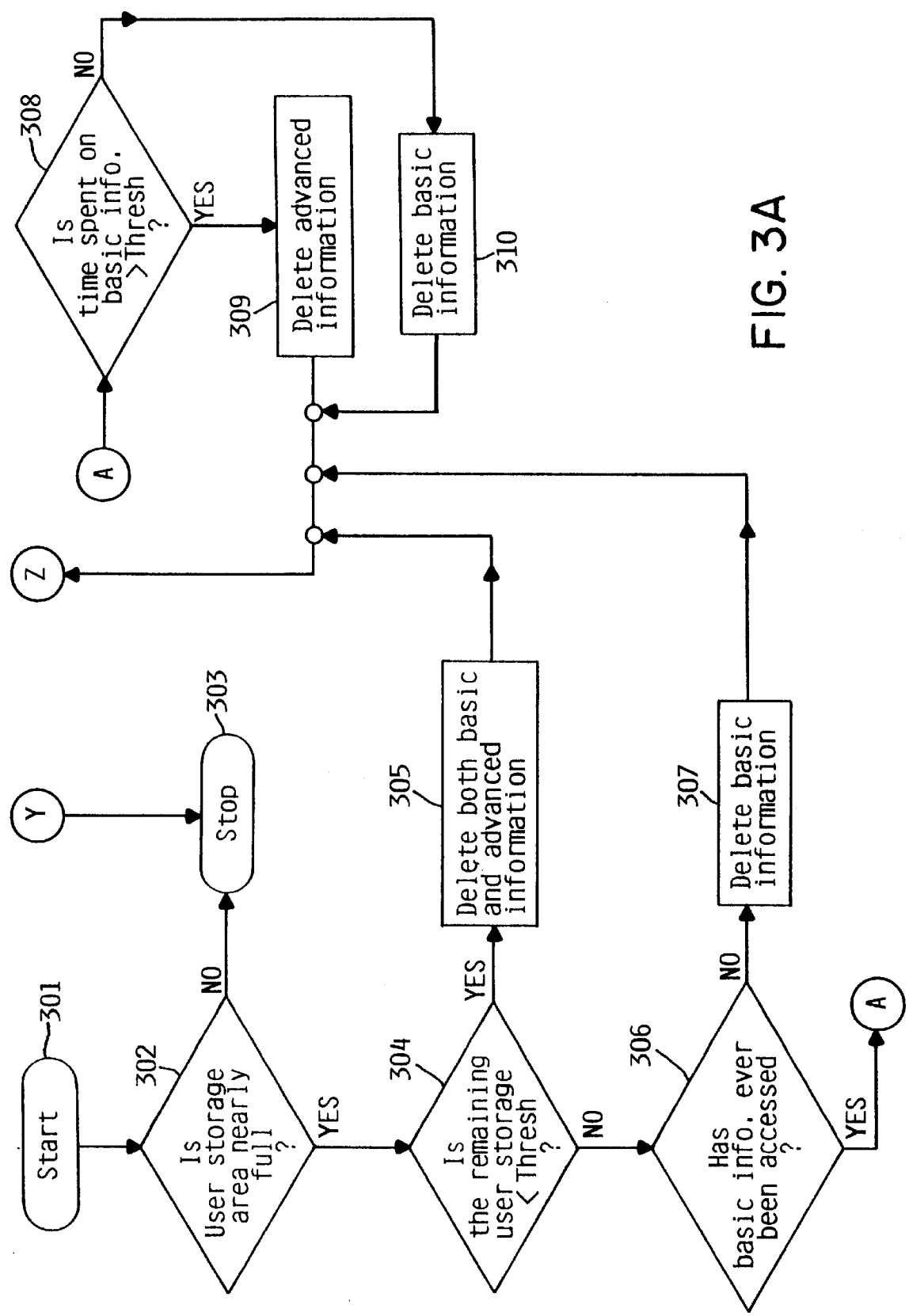
FIG. 3 illustrates a flow chart of a storage method according to an exemplary embodiment of the invention.
Figure 3B:
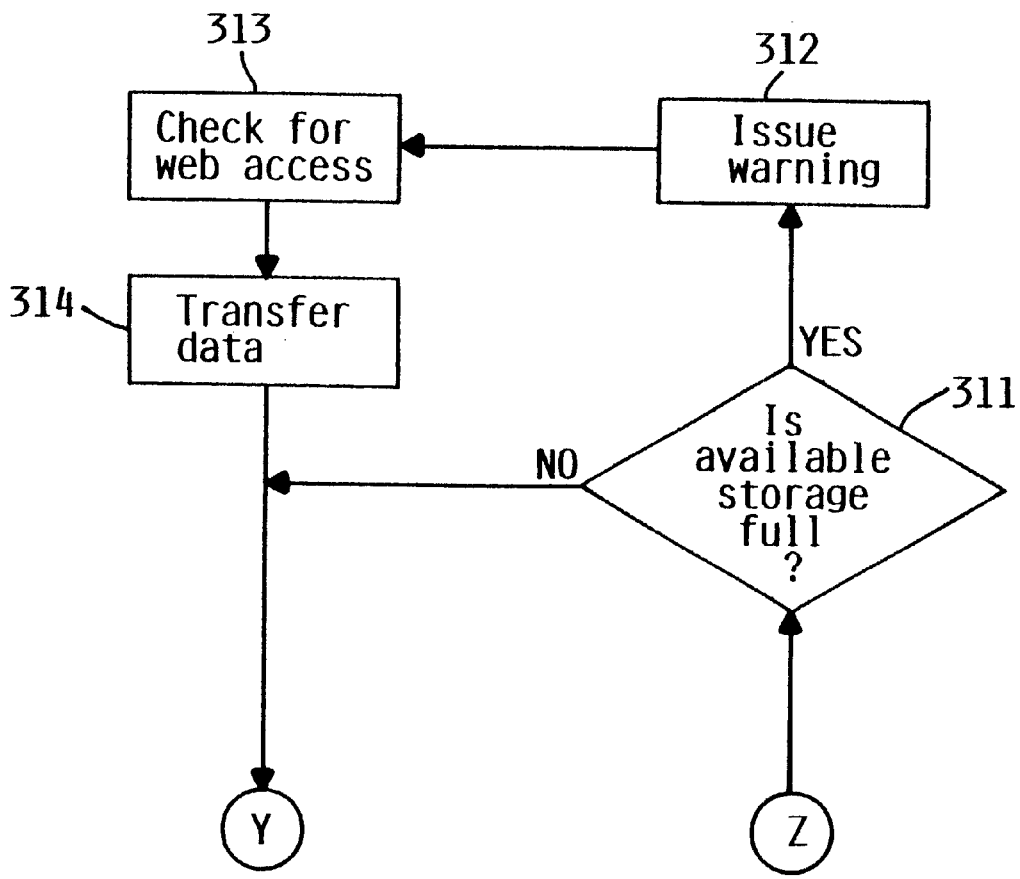

FIG. 3 is a flow chart showing how an exemplary embodiment of the invention decides what data to overwrite and when to do so. The flow begins at Start 301 and at decision block 302 determines if the user storage area is nearly full. As previously mentioned, instructional information need only be overwritten when user storage has run out. If the user storage area is not nearly full, flow Stops at 303.

If the user storage area is nearly full (YES), then flow proceeds to decision block 304 where it is determined if the remaining user storage is below a threshold value. If it is below the threshold (YES), then flow goes to block 305 where both basic and advanced instructional information is deleted. In this case, because user storage space is running out, it is necessary to delete any instructional information remaining to make room for user data. (It may be that the basic instructional information or the advanced instructional information has already been deleted in a previous pass or passes through the algorithm, described below.)

However, when it is determined in decision block 311 that all the instructional information has already been deleted and the user space is still running low, i.e., the available storage is full, a warning is issued at block 312, a check for web access is made at block 313, if web access is available, at block 314, user data can be transferred for storage at the web site for later retrieval and/or instructional data could be temporarily downloaded for display if needed by the user, and then routine stops at 303.

Where the device does not have web access, user data could be transferred to an external data storage device, if available. For example, the device may have a serial or parallel port for transferring data to a portable disk drive, such as a zip drive, for external storage.

Alternatively to overwriting all the instructional information in block 305, some information could be marked as read-only, such as the company address, the device serial/model numbers, or the address of where to send stored images, e.g., electronically over a network or physically stored on a removable memory card, for printing, etc.

In the above description, the instructional information is divided into basic and advanced information, however this was done for the purpose of simplifying explanation. The invention is not limited to this simple division of the instructional information. For example, there could be multiple levels of training/instructional information.

Further, besides the automatic deleting of information, instructions could be manually deleted by a user independently, or interactively. For example, after the instruction for an associated function has been accessed and reviewed by a user, the user could be prompted whether to delete the instruction or not.

Further, in the case where an external data storage device is available to the user, such as an external zip drive, or the like, rather than simply overwriting the pre-stored instructional information in any of the above-mentioned steps, an option would be that the instructional information could be transferred to the external storage for later access, i.e., backed-up, before the on-board storage space is overwritten with user data.

Returning to the flow chart, if the determination in block 304 is that the remaining user storage is not below the threshold value (NO), then flow proceeds to decision block 306 where it is determined whether basic instructional information has ever been accessed. If the determination in 306 is NO, the flow proceeds to block 307 where the basic instructional information is deleted. Here it is assumed that the user is an 'expert' user and the basic information is not needed.

But if the determination in 306 is YES, then flow goes to decision block 308 (via 'A') where it is determined whether the time a user has spent on basic instructional information is above a threshold value. In this case, if the determination is YES the time spent on basic instructional information is greater than the threshold, then flow proceeds to block 309 where the advanced instructional information is deleted. It is assumed that the user is a 'novice' user and the advanced information will never be needed.

However, if the determination in 308 is NO the time spent on basic information is not above the threshold, the flow proceeds to block 310 where the basic instructional information is deleted. Here it is assumed that the user has advanced to become an 'expert' user and the basic information is no longer needed.

The algorithm in the exemplary method of FIG. 3, is based on several premises that could be changed within the spirit and scope of the invention. These are that:

1) a frequency of access to the pre-stored instructional information defines its usefulness;
2) the more times that the most basic instructional information is used, the more novice the user;
3) if the basic instructional information has not been accessed by the time that all of the user storage space has been consumed, then the basic information is eliminated; and
4) if none of the instructional information is accessed by the time the user storage is consumed, then all of the instructional information is eliminated.

Figure 4:
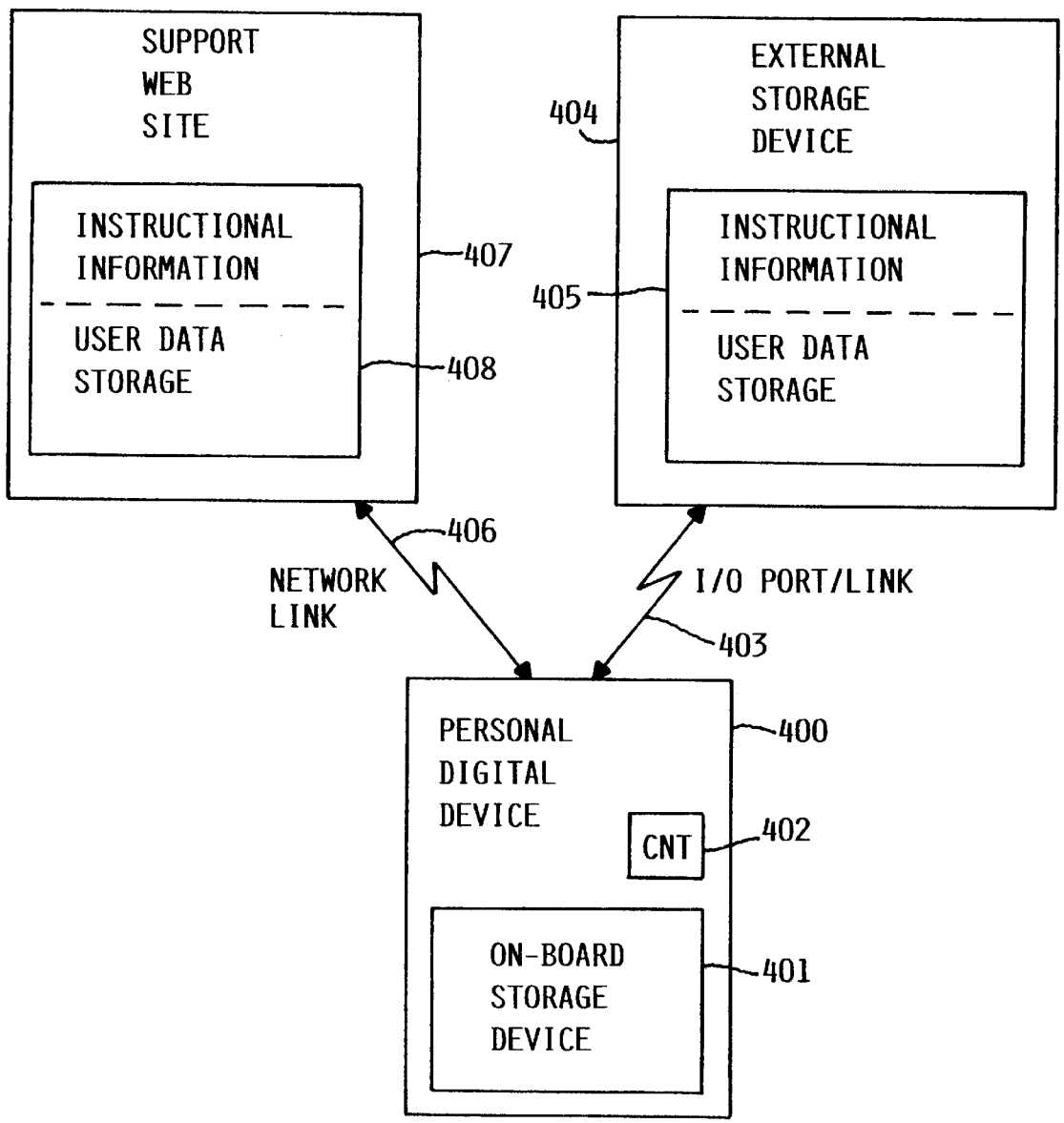
FIG. 4 illustrates a block diagram of an arrangement according to an exemplary embodiment of the invention.

FIG. 4 illustrates a simplified block diagram of an arrangement according to an exemplary embodiment of the invention. A personal digital device 400 has on-board storage 401 and an on-board control 402 for managing the storage and access of user data and instructional information for the device 400. The device 400 may be connectable via an input/output (I/O) port or link 403 to an external storage device 404 which can store either or both of instructional information and user data, as indicated by block 405. In addition, or alternatively, the device 400 may have access to a network link 406 to a remote support web site represented by block 407, e.g., over the Internet, where storage of instructional information and/or user data is possible as represented by block 408.

In summary, in the emerging market for small personal digital devices, the invention offers a way to store large amounts of instructional, advertisement, and other information that is pre-loaded onto a device and yet selectively delete it by overwriting adaptively, based on a determination of how useful the information is to the user. This is transparent to the user making the device easy to use.

The invention is advantageously applicable to a reusable (and therefore recyclable) personal digital system that is capable of capturing and storing digital information. The capability afforded by digital technology allows for much flexibility. Both a user storage area and an instructions/updates/etc. storage area, are provided on the storage device. The instructional data is eliminated only after all of the nominal user data space is consumed. However, some important instructional information could be marked so that it cannot be overwritten, such as the manufacturing company address, a serial number, or the like. The specific pre-loaded instructions that are overwritten are chosen based on their importance to a particular user, as determined by the algorithm. There can be multiple levels of instructional information defined, from basic to advanced.

This intelligent overwriting is based on what operational features on a specific device have already been mastered by a user, what features are not typically used or will probably not be used, and what access the device has to a communications network (or other external storage device) where the information might easily be accessed, and/or user data stored, rather than from the storage means on the device. The invention is useful with new and/or recyclable devices.

At least some portions of the invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A storage control method for a device having a total storage area which is divided into a plurality of sections based on the type of information stored therein, instructional information being stored in a first section of the total storage area, and a second section of the total storage area being available for storing user information when the device is used, the method comprising:

monitoring the amount of free space remaining in the second section; and selectively overwriting instructional information in the first section with user information when additional user information storage is needed.

2. The method according to claim 1, further comprising monitoring use of the instructional information in the first section;

wherein the selectively overwriting is based on the amount of free space remaining in the second section and the use of the instructional information in the first section.

3. The method according to claim 2, wherein the instructional information in the first section is divided into two types, a first type being basic instructional information and a second type being advanced instructional information;

wherein the monitoring use of the instructional information in the first section comprises monitoring which type of instructional information is used and how often;

wherein the selectively overwriting comprises selectively overwriting at least one of the basic instructional information and the advanced instructional information, based on the monitoring of which type of instructional information is used and how often.

4. The method according to claim 3, further comprising:

detecting access to an external source of instructional information;

wherein the selectively overwriting comprises selectively overwriting at least one of the basic instructional information and the advanced instructional information, based on the detecting.

5. The method according to claim 3, wherein the basic instructional information comprises at least one of:

instructions on how to set-up the device for first use;
instructions on how to use the device; and
instructions on optional equipment which is available for purchase from the manufacturer.

6. The method according to claim 1, wherein when the monitoring indicates the amount of free space remaining in the second section is below a threshold amount, then the selectively overwriting comprises selectively overwriting all of the instructional information in the first section with user information.

7. The method according to claim 6, further comprising:
detecting when the total storage area is full of user information; and
when it is detected that the total storage area is full of user information:
issuing a warning;
checking for the availability of external storage; and
if external storage is available, then transferring user data to the external storage.

8. The method according to claim 1, further comprising:
checking for the availability of an external source of instructional information; and
if an external source of instructional information is accessible, then the selectively overwriting comprises overwriting all of the instructional information in the first section when additional user information storage is needed.

9. The method according to claim 1, wherein at least a portion of the instructional information comprises read-only information which cannot be overwritten.

10. The method according to claim 1, wherein the instructional information in the first section is divided into a plurality of types, the selectively overwriting comprising selectively overwriting instructional information based on the type of instructional information.

11. The method according to claim 1, further comprising:
checking for the availability of external storage; and
if external storage is accessible, then before the selectively overwriting, transferring the instructional information to the external storage and storing the instructional information in the external storage for later access.

12. A computer program product comprising a recording medium, and means for implementing a storage control method according to claim 1.

13. An article of manufacture comprising:
a computer program product; and
means for causing a computer to provide a method of storage control according to claim 1.

14. A computer program having a plurality of program steps to be executed on a computer to perform storage control according to the method of claim 1.

15. An arrangement comprising:
a personal digital device having on-board storage, the on-board storage including user data storage space and pre-stored instructional information storage space;
control means in the personal digital device, for controlling user data storage;
wherein the control means controls user storage so that:
the instructional information is divided into basic and advanced information;
a frequency of access to the instructional information is detected and a user proficiency level determined based on the premise that the higher the frequency of access to the instructional information, the more novice the user;
if the user proficiency level is determined to be novice, then the advanced instructional information is deleted; and
if the user proficiency is determined to be advanced, then the basic instructional information is deleted.

16. The arrangement according to claim 15, wherein the control means further controls the user storage so that:
the amount of free user storage space is detected;
if the basic information has never been accessed by the time that all of the user storage space has been used, then the basic information is deleted; and
if none of the basic or advanced instructional information has been accessed by the time that all of the user storage space has been used, then all of the instructional information is deleted.

17. The arrangement according to claim 16, wherein the control means further controls the user storage so that:
if the on-board storage is full, and additional user data storage space is required, then:
a warning is issued;
access to an external storage is checked; and
if access to an external storage is available, then user data is transferred to the external storage.

18. The arrangement according to claim 17, wherein the external storage comprises an external direct access storage device.

19. The arrangement according to claim 18, wherein the external storage comprises an external high-capacity removable disk device.

20. The arrangement according to claim 17, wherein the external storage comprises a remote web site.

* * * * *